US010178616B2

United States Patent
Zeng et al.

(10) Patent No.: US 10,178,616 B2
(45) Date of Patent: Jan. 8, 2019

(54) ENHANCED DISCOVERY CHANNEL FOR INTERWORKING BETWEEN A CELLULAR WIDE-AREA COMMUNICATION SYSTEM AND A WIRELESS LOCAL-AREA COMMUNICATION SYSTEM

(71) Applicant: Avago Technologies International Sales Pte. Limited, Singapore (SG)

(72) Inventors: Erlin Zeng, Beijing (CN); Na Wei, Beijing (CN); Wei Hong, Beijing (CN); Haiming Wang, Beijing (CN)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 14/768,169

(22) PCT Filed: Feb. 21, 2013

(86) PCT No.: PCT/CN2013/071744
§ 371 (c)(1),
(2) Date: Aug. 14, 2015

(87) PCT Pub. No.: WO2014/127516
PCT Pub. Date: Aug. 28, 2014

(65) Prior Publication Data
US 2015/0382299 A1 Dec. 31, 2015

(51) Int. Cl.
*H04W 24/10* (2009.01)
*H04W 48/16* (2009.01)
(Continued)

(52) U.S. Cl.
CPC ....... *H04W 52/0216* (2013.01); *H04W 24/10* (2013.01); *H04W 48/16* (2013.01);
(Continued)

(58) Field of Classification Search
CPC ..... H04W 24/10; H04W 48/16; H04W 72/04; H04W 52/0216; H04W 52/0206; H04W 88/08; H04W 88/02
(Continued)

(56) References Cited

U.S. PATENT DOCUMENTS 8,619,674 B1 * 12/2013 Shipley ................... H04W 4/00
370/328
2004/0105434 A1 * 6/2004 Baw ...................... H04W 84/12
370/355
(Continued)

FOREIGN PATENT DOCUMENTS

| CN | 1993630 | 7/2007 |
|---|---|---|
| CN | 102883408 | 1/2013 |

(Continued)

OTHER PUBLICATIONS

International Search Report for PCT/CN2013/071744 dated Oct. 17, 2013.
(Continued)

*Primary Examiner* — Maharishi V Khirodhar
*Assistant Examiner* — Natali Pascual Peguero
(74) *Attorney, Agent, or Firm* — Foley & Lardner LLP

(57) ABSTRACT

The present invention relates to methods, apparatuses and a computer program product for an enhanced discovery channel for interworking between a cellular wide-area communication system and a wireless local-area communication system. The present invention includes inserting, in a discovery channel, information indicating an interworking capability of a small cell base station between a cellular wide-area communication system and a wireless local-area communication system, and transmitting, by the base station, the discovery channel including the information to a user equipment located in the small cell.

19 Claims, 11 Drawing Sheets

(51) Int. Cl.
*H04W 52/02* (2009.01)
*H04W 72/04* (2009.01)
*H04W 88/02* (2009.01)
*H04W 88/08* (2009.01)

(52) U.S. Cl.
CPC ....... *H04W 52/0206* (2013.01); *H04W 72/04* (2013.01); *H04W 88/02* (2013.01); *H04W 88/08* (2013.01); *Y02D 70/00* (2018.01); *Y02D 70/1262* (2018.01); *Y02D 70/1264* (2018.01); *Y02D 70/142* (2018.01)

(58) Field of Classification Search
USPC .......................... 370/241, 310, 311, 252, 328
See application file for complete search history.

(56) References Cited

U.S. PATENT DOCUMENTS

| | | | | |
|---|---|---|---|---|
| 2006/0142034 A1* | 6/2006 | Wentink | ............... | H04W 8/005 455/515 |
| 2010/0322092 A1* | 12/2010 | Yu | ..................... | H04L 25/03012 370/252 |
| 2011/0092234 A1* | 4/2011 | Kim | ..................... | H04W 48/14 455/507 |
| 2012/0329456 A1* | 12/2012 | Makh | ..................... | H04W 48/14 455/435.1 |
| 2013/0040603 A1* | 2/2013 | Stahlberg | .............. | H04L 63/126 455/410 |
| 2013/0159458 A1* | 6/2013 | Yu | ........................... | H04L 67/10 709/217 |
| 2014/0247807 A1* | 9/2014 | Westerberg | ........... | H04W 36/34 370/331 |
| 2015/0172940 A1* | 6/2015 | Nagata | ..................... | H04W 4/06 370/252 |
| 2015/0215852 A1* | 7/2015 | Gou | ....................... | H04W 48/16 455/434 |
| 2015/0230153 A1* | 8/2015 | Zhang | .................... | H04W 48/16 455/434 |

FOREIGN PATENT DOCUMENTS

| | | | | |
|---|---|---|---|---|
| CN | 102883408 A | * | 1/2013 | ............ H04W 48/16 |
| WO | WO-2012/088353 | | 6/2012 | |

OTHER PUBLICATIONS

Written Opinion for PCT/CN2013/071744 dated Oct. 17, 2013.
International Preliminary Report on Patentability for PCT/CN2013/071744 dated Aug. 25, 2015.

* cited by examiner

Fig. 8 receiving a discovery channel from a small cell base station, the discovery channel comprising information indicating an interworking capability of the small cell base station between a cellular wide-area communication system and a wireless local-area communication system — S81

ENHANCED DISCOVERY CHANNEL FOR INTERWORKING BETWEEN A CELLULAR WIDE-AREA COMMUNICATION SYSTEM AND A WIRELESS LOCAL-AREA COMMUNICATION SYSTEM

RELATED APPLICATIONS

This application is the U.S. National Stage of and claims priority to and the benefit of International Patent Application Number PCT/CN2013/071744, filed Feb. 21, 2013. The entire contents of the foregoing are hereby incorporated herein by reference for all purposes.

FIELD OF THE INVENTION

The present invention relates to an enhanced discovery channel for interworking between a cellular wide-area communication system and a wireless local-area communication system, and more particularly, relates to methods, apparatuses and a computer program product for an enhanced discovery channel for interworking between a cellular wide-area communication system and a wireless local-area communication system.

BACKGROUND

The ISM (industrial, scientific and medical) radio bands are license-exempt bands, which were originally reserved internationally for the use of radio frequency (RF) energy for industrial, scientific and medical purposes other than communications. However, in recent years these bands have also been shared with license-free error-tolerant communications applications such as Wireless local area networks (WLAN) and cordless phones in the 915 MHz, 2.450 GHz, and 5.800 GHz bands. A main usage on these ISM bands is 'WiFi'.

'WiFi' is not a technical term. However, the WiFi Alliance has generally enforced its use to describe only a narrow range of connectivity technologies including wireless local area network (WLAN) based on the IEEE 802.11 standard, which is a set of standards carrying out WLAN communication in the 2.4, 3.6 and 5 GHz frequency bands (cf. document [1]).

ISM band 2.4 GHz (WiFi 802.11b and 802.11g/n)
ISM band 5 GHz (WiFi 802.11a/n/ac)

Recent growth in data traffic driven by mobile applications on smart phone devices, tablets, etc. has continued to strain the capacity of today's networks. Therefore, network operators are increasingly utilizing un-licensed WiFi spectrum to cope with such network congestion, and this trend is expected to accelerate further as traffic demand continues to grow.

Use of unlicensed spectrum is a cost-effective mean to add the needed capacity of today's networks, given the limited availability and high cost of licensed spectrum. Currently, WLAN is integrated as a separate access network to the 3GPP EPC ($3^{rd}$ Generation Partnership Project Evolved Packet Core). This requires extra cost of deploying the complete WLAN access network and also impacts the 3GPP core network entities. Existing WiFi offload solutions are based on this deployment model of distinct 3GPP and WLAN access networks using a common core with selective switching of flows based on operator/user policies. Other solutions are possible that result in a tighter integration and aggregation of 3GPP access network components with WLAN access networks without any impact to and reusing the same 3GPP core network elements.

It was firstly proposed in a discussion paper and Study Item (SI) proposal in RAN#53 (cf. documents [2] and [3]), which propose that the study may involve extending the same design principles already defined for carrier aggregation to support aggregation/coordination of cells/carriers across Wide and Local Area Networks as well.

There was another SI proposal in RAN#57 named "WLAN/3GPP Radio Interworking", which gains almost all companies' support (cf. document [4]). The objectives of the study are to evaluate LTE-WLAN and UTRA-WLAN interworking procedures addressing the issues above while improving seamless and non-seamless mobility.

Further, some small cell discovery and PDCH design aspects are discussed in document [5].

REFERENCES

[1] IEEE Std. 802.11TM—2007, "WLAN MAC and PHY Specifications";
[2] RP-111094, "Discussions on Carrier Aggregation across LTE and WiFi", Intel, RAN#53, December 2011;
[3] RP-111104, "Radio Level Dynamic Flow Switching between 3GPP-LTE and WLAN", Intel, RAN#53, September 2011;
[4] RP-121455, "New Study Item Proposal on WLAN/3GPP Radio Interworking", Intel, RAN#57, September 2012;
[5] R1-120398, Enhanced Cell Identification for Additional Carrier Type, NTT DoCoMo.

SUMMARY OF THE INVENTION

According to exemplary aspects of the present invention, there are provided methods, apparatuses and a computer program product for an enhanced paging operation for power saving mode.

Various aspects of exemplary embodiments of the present invention are set out in the appended claims.

According to an exemplary aspect of the present invention, there is provided a method comprising:
inserting, in a discovery channel, information indicating an interworking capability of a small cell base station between a cellular wide-area communication system and a wireless local-area communication system, and
transmitting, by the base station, the discovery channel including the information to a user equipment located in the small cell.

According to another exemplary aspect of the present invention, there is provided a method, comprising:
receiving a discovery channel from a small cell base station,
the discovery channel comprising information indicating an interworking capability of the small cell base station between a cellular wide-area communication system and a wireless local-area communication system.

According to another exemplary aspect of the present invention, there is provided a method, comprising:
transmitting a discovery channel and an access point beacon of a wireless local area communication system,
wherein the transmission timing and the transmission interval of the access point beacon is set based on the transmission timing and transmission interval of the discovery channel.

According to another exemplary aspect of the present invention, there is provided a method, comprising:
receiving a discovery channel from a small cell base station, and after reception of the discovery channel, initializing a search for an access point beacon of a wireless focal-area communication system, wherein a transmission timing and a transmission interval of the access point beacon is set based on a transmission timing and a transmission interval of the discovery channel.

According to another exemplary aspect of the present invention, there is provided a method, comprising:

detecting a discovery channel from a small cell base station of a cellular wide-area communication network, detecting an access point of a wireless local area communication system located at the small cell base station, and reporting, to a base station of the cellular wide-area communication network, the detection of the access point.

According to another exemplary aspect of the present invention, there is provided an apparatus for use in a base station, comprising:

at least one processor, and at least one memory including computer program code, the at least one memory and the computer program code arranged to, with the at least one processor, cause the apparatus at least to perform:

inserting, in a discovery channel, information indicating an interworking capability of a small cell base station between a cellular wide-area communication system and a wireless local-area communication system, and transmitting the discovery channel including the information to a user equipment located in the small cell.

According to another exemplary aspect of the present invention, there is provided an apparatus for use in a user equipment, comprising at least one processor, and at least one memory including computer program code, the at least one memory and the computer program code arranged to, with the at least one processor, cause the apparatus at least to perform:

receiving a discovery channel from a small cell base station, the discovery channel comprising information indicating an interworking capability of the small cell base station between a cellular wide-area communication system and a wireless local-area communication system.

According to another exemplary aspect of the present invention, there is provided an apparatus for use in a base station, comprising:

at least one processor, and at least one memory including computer program code, the at least one memory and the computer program code arranged to, with the at least one processor, cause the apparatus at least to perform:

transmitting a discovery channel and an access point beacon of a wireless local area communication system, wherein the transmission timing and the transmission interval of the access point beacon is set based on the transmission timing and transmission interval of the discovery channel.

According to another exemplary aspect of the present invention, there is provided an apparatus for use in a user equipment, comprising:

at least one processor, and at least one memory including computer program code, the at least one memory and the computer program code arranged to, with the at least one processor, cause the apparatus at least to perform:

receiving a discovery channel from a small cell base station, and after reception of the discovery channel, initializing a search for an access point beacon of a wireless local-area communication system, wherein a transmission timing and a transmission interval of the access point beacon is set based on a transmission timing and a transmission interval of the discovery channel.

According to another exemplary aspect of the present invention, there is provided an apparatus for use in a user equipment, comprising at least one processor, and at least one memory including computer program code, the at least one memory and the computer program code arranged to, with the at least one processor, cause the apparatus at least to perform:

detecting a discovery channel from a small cell base station of a cellular wide-area communication network, detecting an access point of a wireless local area communication system located at the small cell base station, and reporting, to a base station of the cellular wide-area communication network, the detection of the access point.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is arranged to cause the computer to carry out the method according to any one of the aforementioned method-related exemplary aspects of the present invention.

Such computer program product may comprise or be embodied as a (tangible) computer-readable (storage) medium or the like on which the computer-executable computer program code is stored, and/or the program may be directly loadable into an internal memory of the computer or a processor thereof.

Advantageous further developments or modifications of the aforementioned exemplary aspects of the present invention are set out in the dependent claims.

BRIEF DESCRIPTION OF THE DRAWINGS

For a more complete understanding of exemplary embodiments of the present invention, reference is now made to the following description taken in connection with the accompanying drawings in which:

FIG. 8 is a flowchart illustrating a method according to certain embodiments of the present invention;

DESCRIPTION OF EXEMPLARY EMBODIMENTS

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

One objective of the present invention is the enhancement to access network mobility and selection.

Figure 1:
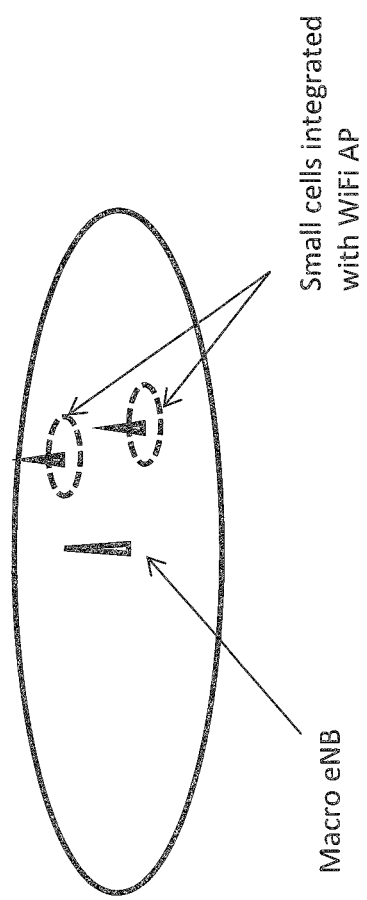
FIG. 1 is an overview illustrating a scenario for LTE and WiFi interworking to which the present invention is applicable.

FIG. 1 shows an example of a typical scenario for LTE and WiFi interworking, to which the present invention is applicable. In this scenario, macro eNB is taking care of coverage in wide area, and small cells with LTE as well as WiFi capabilities are used to boost capacity in hot spot or in indoor area.

As small cells have both LTE and WiFi radio capabilities, a baseline procedure for interworking is as follows:
Step1: UE detects small cells,
Step2: UE reports the detection of certain small cells to macro eNB,
Step3: Macro controls UE's data offloading to small cell LTE or WiFi Step3 may include WiFi AP selection, if UE detects multiple small cells with different signal strength or loads. If there are interfaces between small cells and macro eNB, small cell related information such as load, etc., can be shared to macro cell in advance. With this information, the macro eNB can further configure the UE to use the most suitable small cell or WiFi AP.

However, the above described baseline procedure at least bases on the following assumptions:
Assumption #1: Small cells' LTE radios are switched ON, and UE can detect these small cells and assume similar signal strength of WiFi radio as LTE radio signal from the small eNB.
Assumption #2: There is an interface between macro and small cells for WiFi related info sharing, such as load information.

Figure 2:
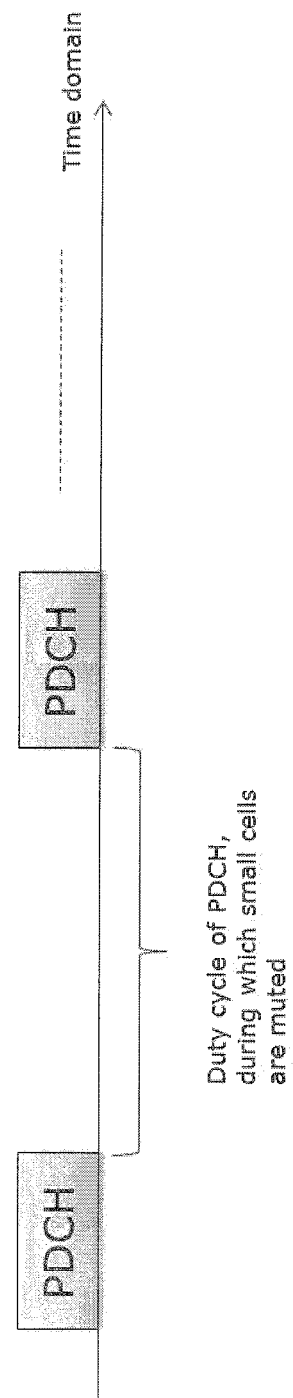
FIG. 2 is a diagram illustrating an example of PDCH for small cell discovery to which the present invention is applicable.

For Assumption #1, it is not always true as small cell may turn off LTE radio for energy saving. In this case, in LTE Rel-12 there may be new mechanism specified such as physical discovery channel (PDCH). An example of PDCH for small cell discovery is given in FIG. 2.

So it is to be further discussed if UE can assume that the WiFi signal strength from the same small cell is comparable to the PDCH. Furthermore, at the stage of small cell discovery and reporting, UE may not know whether WiFi offloading is possible from the small cell. Also, to keep scanning the WiFi signal by UE and transmitting WiFi beacon by small cells are not power efficient.

For Assumption #2, if such interfaces between macro and small cells are not always available, it is possible that UE first gets such information from small cells and then reports to macro eNB. To this direction, UE will need to first detect the PDCH, and then somehow trigger the small cells to switch on. After that, UE can get the information from small cells and report to macro eNB. The whole procedure may have very long time delay, and thus has room for optimization.

Thus, according to certain aspects of the present invention, it is proposed that the PDCH is extended to indicate LTE and WiFi interworking capability and/or other WiFi assistant information to a UE.

Figure 3:
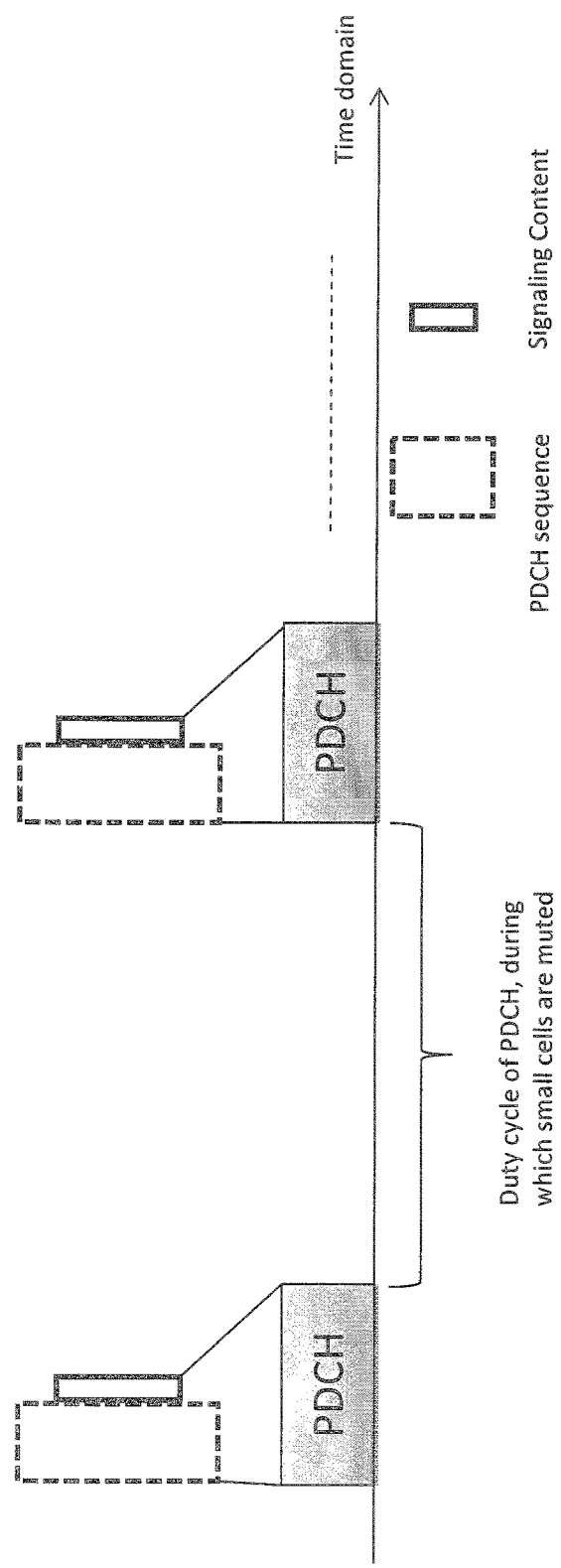
FIG. 3 is a diagram illustrating an example of PDCH with signaling content according to certain embodiment of the present invention.

Each PDCH instance can have two parts, i.e., predefined sequence and signaling content. An example is given in FIG. 3. The signaling content can use predefined transmission scheme (modulation and coding scheme, transmission diversity, etc.). The exact time and frequency resources of the signaling content part can be linked to the sequence part, e.g., a fixed resource block with predefined offset to the sequence part.

The WiFi interworking assistant information conveyed by the signaling content part can at least include
  WiFi interworking capability of the same small cell;
  WiFi discovery assistant information such as beacon interval, SSID (Service Set Identifier), working channel;
  WiFi load indication;
  Neighbor WiFi AP (Access Point) information.

In extreme case, the signaling content part can be replaced by using different scrambling sequence group to indicate whether WIFI interworking is supported or not by the same small cell.

In practice, the payload size conveyed by the signaling content part is a tradeoff between the link performance of such enhanced channel and the amount of information bits that can be signaled. It is possible to predefine several signaling content format with different payload sizes and let UE blindly search among all the formats.

Further, it is proposed that the WiFi beacon transmissions interval can be fine-tuned according to PDCH duty cycle. Some predefined linkage between PDCH duty cycle and WiFi beacon transmissions can help UE to quickly search the WiFi AP and reduce unnecessary scanning.

WiFi beacon transmissions interval can be adjusted according to PDCH duty cycle. This ensures power saving as PDCH has large time periodicity and small cell only needs to power ON when PDCH is transmitted (e.g., tens of subframes per second or several seconds).

Figure 4:
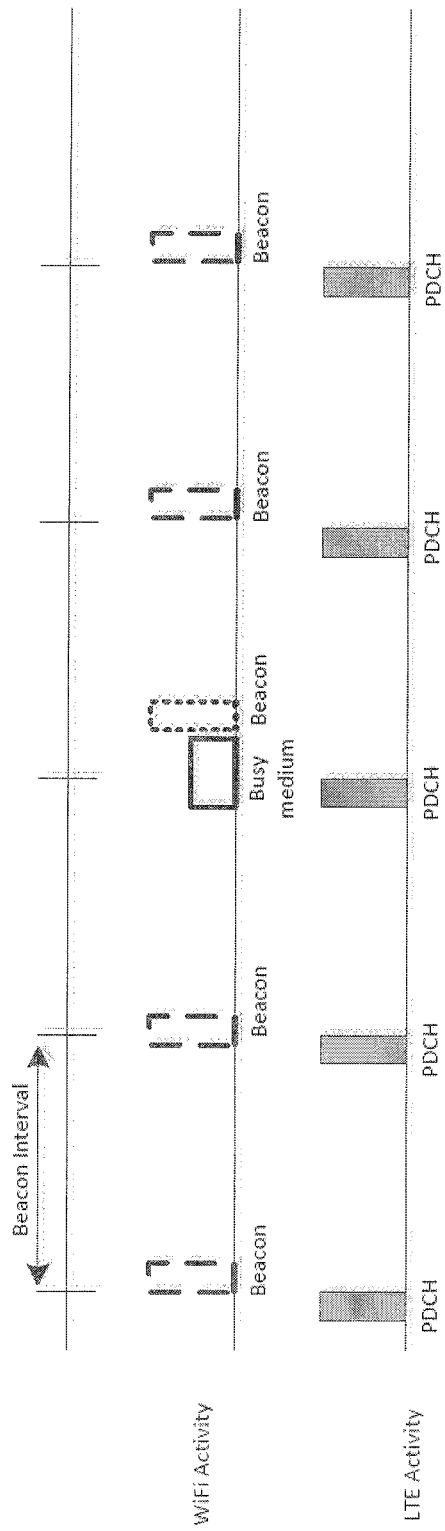
FIG. 4 is a diagram illustrating timing between PDCH and WiFi beacon transmission according to certain embodiments of the present invention.

As shown in FIG. 4, the relative time position between PDCH and WiFi beacon signal can be predefined or signaled, as described above according to invention point #1. After detection of PDCH, UE shall prioritize the WiFi signal search based on the estimated WiFi beacon positions instead of turning on its WiFi module to search AP all the time, which could save UE's power.

As a further matter, it is proposed that the UE is explicitly or implicitly required to report WiFi AP detection and/or related information to macro eNB, once it detects PDCH from a small cell.

Once UE detects PDCH from small cell and when small cell detection report is triggered, UE can report WiFi measurement at the same time.

One alternative in this regard is that in the proposed signaling content some information bits are used to order such WiFi measurement report explicitly. In this case, UE shall report the WiFi measurement results together with the detection report of PDCH.

Another possibility in this regard is that it can be predefined that UE shall by default report LTE small cell detection as well as WiFi measurement results upon the detection of the small cells, as long as the enhanced PDCH indicates WiFi capability of the small cell. This alternative saves explicit signaling of report order.

One more alternative in this regard is that UE in the first step reports the WiFi detection, and then it takes some time to measure the actual WiFi signal strength. In this alternative, the first report (PDCH detection and WiFi signal detection) and the second report (WiFi strength or other related WiFi properties of small cell that UE detects) can have fixed or predefined time offset between each other.

Thus, it is an advantage of the certain embodiments of the present invention that with enhanced PDCH, the UE can get assistant information for interworking faster. This saves the UE's effort in searching the WiFi signal and also reduces the time delay of the whole procedure.

Figure 5:
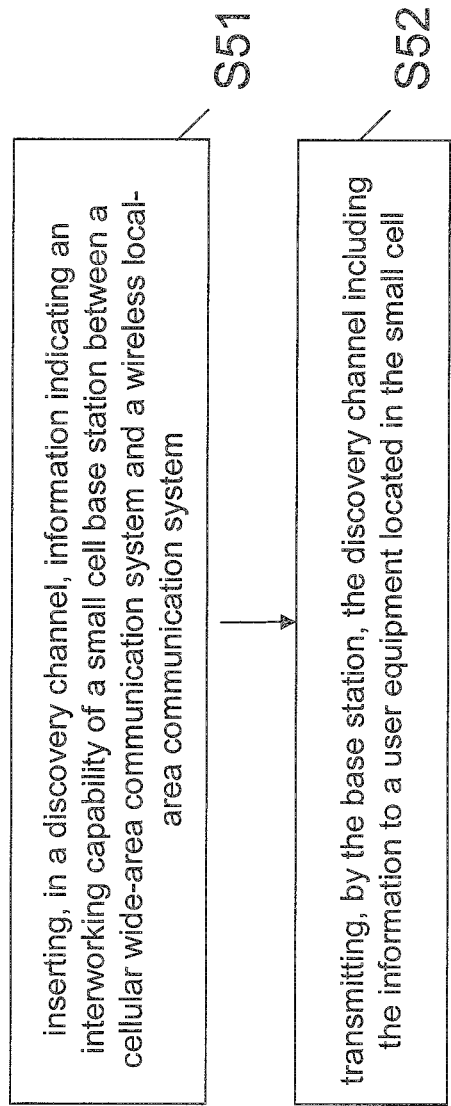
FIG. 5 is a flowchart illustrating a method according to certain embodiments of the present invention.

FIG. 5 shows a principle flowchart of an example for a method according to certain embodiments of the present invention. That is, as shown in FIG. 5, this method for use in a base station comprises inserting, in a discovery channel, information indicating an interworking capability of a small cell base station between a cellular wide-area communication system and a wireless local-area communication system in a step S51, and transmitting, by the base station, the discovery channel including the information to a user equipment located in the small cell in a step S52.

Figure 6:
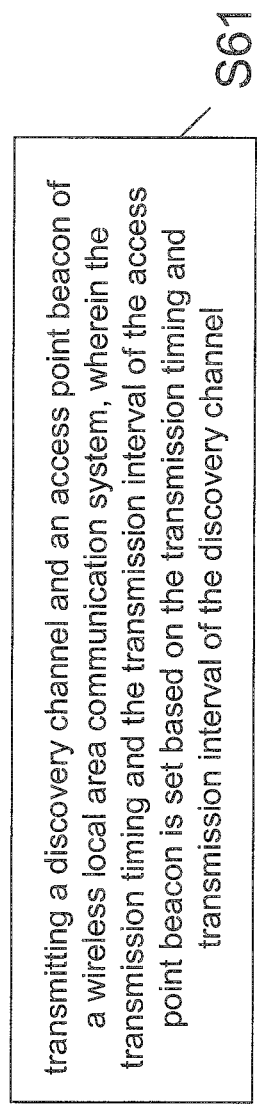
FIG. 6 is a flowchart illustrating another method according to certain embodiments of the present invention.

According to exemplary embodiments of the present invention, the discovery channel includes a request for requesting the user equipment to report detection of an access point of the wireless local-area communication system to a base station of the cellular wide-area communication network FIG. 6 shows another principle flowchart of an example for a method according to certain embodiments of the present invention. That is, as shown in FIG. 6, this method for use in a base station comprises transmitting, in a step S61, a discovery channel and an access point beacon of a wireless local area communication system, wherein the transmission timing and the transmission interval of the access point beacon is set based on the transmission timing and transmission interval of the discovery channel.

According to exemplary embodiments of the present invention, the relative transmission timing of the access point beacon and the transmission timing of the discovery channel is predefined.

According to exemplary embodiments of the present invention, the method is implemented in a base station located in a Long Term Evolution or Long Term Evolution Advanced based cellular communication network.

Figure 7:
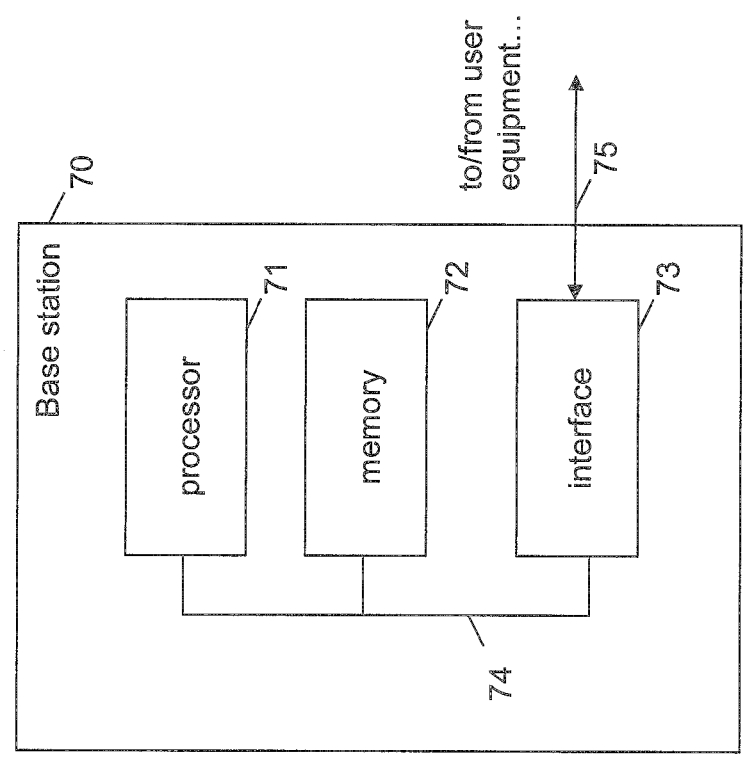
FIG. 7 is a block diagram illustrating an apparatus according to certain embodiments of the present invention.

FIG. 7 shows a principle configuration of an example for an apparatus according to certain embodiments of the present invention. One option for implementing this example for an apparatus according to certain embodiments of the present invention would be a base station in a 3G communication network or an eNB according to LTE/LTE-A.

Specifically, as shown in FIG. 7, the example for an apparatus 70, e.g. a base station or an eNB, comprises at least one processor 71, at least one memory 72 including computer program code, and an interface 73 which are connected by a bus 74 or the like. The at least one memory and the computer program code are arranged to, with the at least one processor, cause the apparatus at least to perform inserting, in a discovery channel, information indicating an interworking capability of a small cell base station between a cellular wide-area communication system and a wireless local-area communication system, and transmitting, by the base station, the discovery channel including the information to a user equipment located in the small cell.

According to exemplary embodiments of the present invention, the at least one memory and the computer program code are arranged to, with the at least one processor, cause the apparatus at least to perform transmitting a discovery channel and an access point beacon of a wireless local area communication system, wherein the transmission timing and the transmission interval of the access point beacon is set based on the transmission timing and transmission interval of the discovery channel.

For further functions of the base station/eNB according to further exemplary embodiments of the present invention, reference is made to the above description of methods according to certain embodiments of the present invention, as described in connection with FIGS. 5 and 6.

FIG. 8 shows another principle flowchart of an example for a method according to certain embodiments of the present invention. That is, as shown in FIG. 8, this method for use in user equipment comprises receiving, in a step S81, a discovery channel from a small cell base station, the discovery channel comprising information indicating an interworking capability of the small cell base station between a cellular wide-area communication system and a wireless local-area communication system.

According to exemplary embodiments of the present invention, the discovery channel comprises a predefined sequence part and signaling content part. Further, the timing and frequency resource of the signaling content part may be linked to the sequence part by a predefined offset.

Moreover, the information indication the interworking capability of the small cell base station may include at least one of discovery assistant information such as beacon interval, SSID, working channel, load indication and neighbor access information of the wireless local-area communication system.

Figure 9:
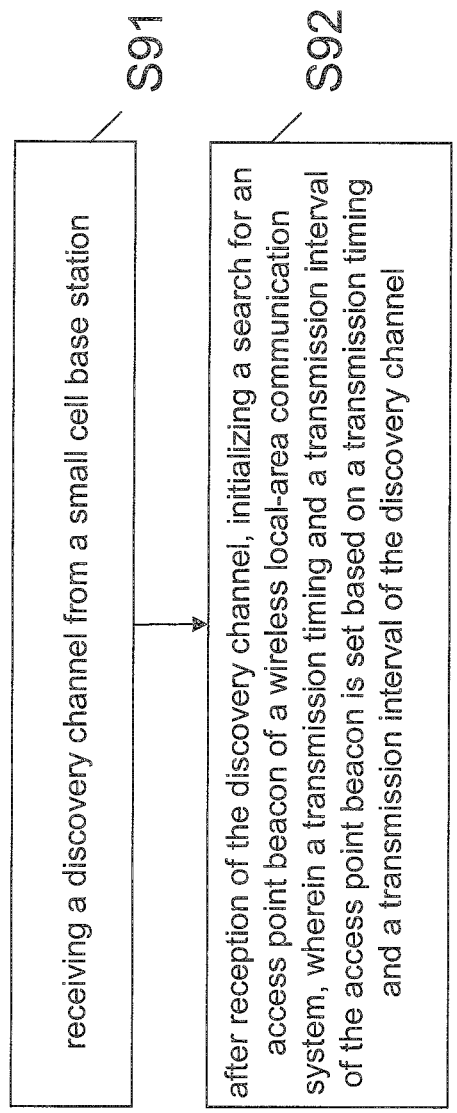
FIG. 9 is a flowchart illustrating another method according to certain embodiments of the present invention.

FIG. 9 shows another principle flowchart of an example for a method according to certain embodiments of the present invention. That is, as shown in FIG. 9, this method for use in user equipment comprises receiving, in a step S91, a discovery channel from a small cell base station, and after reception of the discovery channel, initializing, in a step S92, a search for an access point beacon of a wireless local-area communication system, wherein a transmission timing and a transmission interval of the access point beacon is set based on a transmission timing and a transmission interval of the discovery channel.

Figure 10:
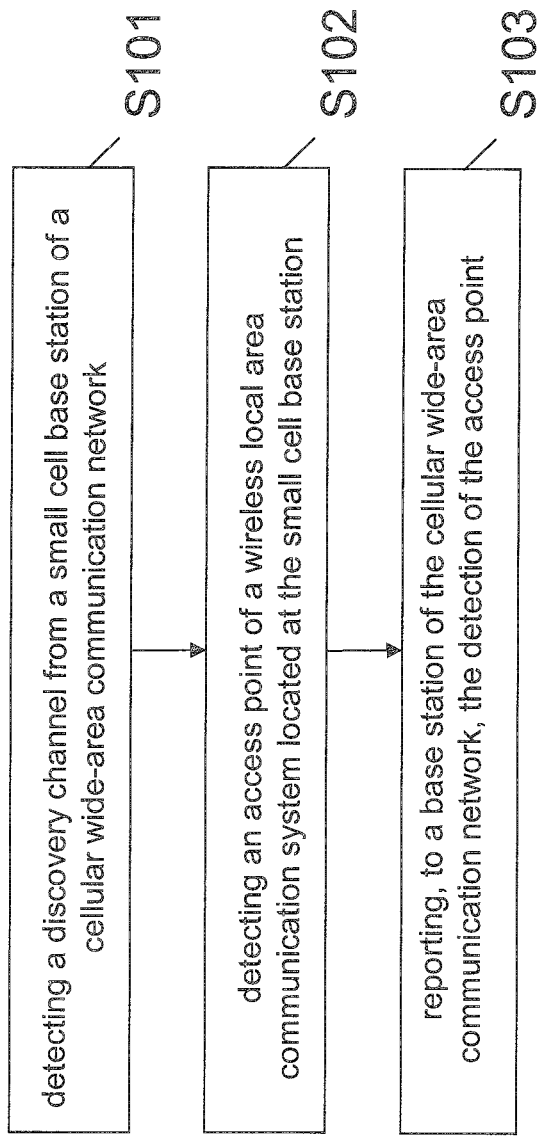
FIG. 10 is a flowchart illustrating another method according to certain embodiments of the present invention.

FIG. 10 shows another principle flowchart of an example for a method according to certain embodiments of the present invention. That is, as shown in FIG. 10, this method for use in user equipment comprises detecting, in a step S102, a discovery channel from a small cell base station of a cellular wide-area communication network, detecting, in a step S102, an access point of a wireless local area communication system located at the small cell base station, and reporting, to a base station of the cellular wide-area communication network, the detection of the access point, in a step S102.

According to exemplary embodiments of the present invention, the reporting is triggered by a predetermined indication in a signaling content of the discovery channel, and/or the predetermined indication is a dedicated information bit for explicitly requesting the reporting.

Further, according to exemplary embodiments of the present invention, the predetermined indication is an indication of the wireless local area communication network capability of the small cell base station.

According to exemplary embodiments of the present invention, the reporting comprises a first part in which the detection of the discovery channel and the detection of the access point of the wireless local area communication network is reported, and a second part in which at least a signal strength of the wireless local area communication network is reported, wherein in the second part, the wireless local area communication network related properties of the small cell base station may further be reported.

According to exemplary embodiments of the present invention, there is a fixed time offset between the first and the second part of the reporting.

According to exemplary embodiments of the present invention, the method is implemented in a user equipment located in a Long Term Evolution or Long Term Evolution Advanced based cellular communication network.

Figure 11:
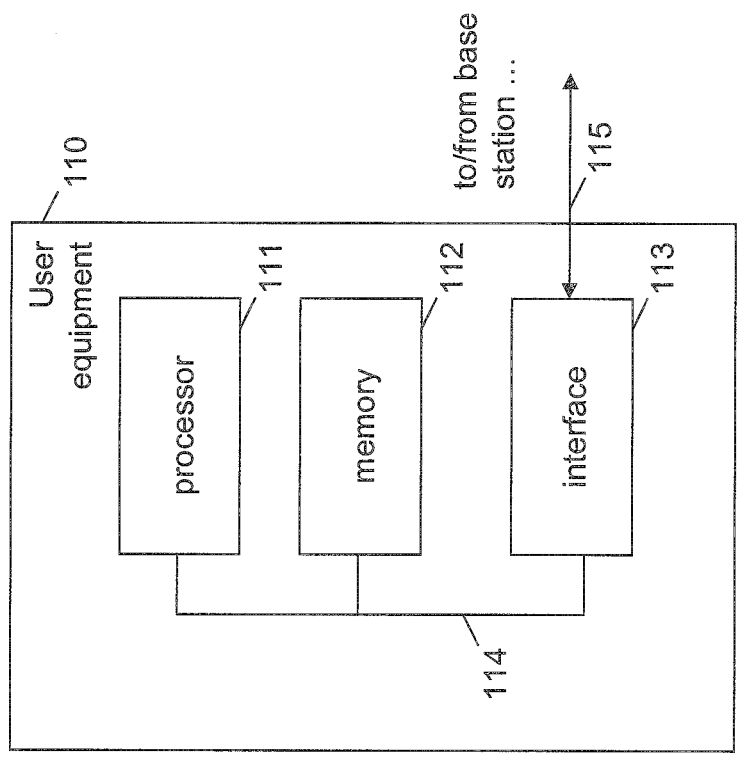
FIG. 11 is a block diagram illustrating another apparatus according to certain embodiments of the present invention.

FIG. 11 shows a principle configuration of an example for an apparatus according to certain embodiments of the present invention. One option for implementing this example for an apparatus according to certain embodiments of the present invention would be a component in a handset such as user equipment UE according to 3G or LTE/LTE-A. For example, the user equipment may be a mobile phone, a personal digital assistant (PDA), a laptop computer, a tablet computer.

Specifically, as shown in FIG. 11, the example for an apparatus 110, e.g. a user equipment, comprises at least one processor 111, at least one memory 112 including computer program code, and an interface 113 which are connected by a bus 114 or the like. The at least one memory and the computer program code are arranged to, with the at least one processor, cause the apparatus at least to perform receiving a discovery channel from a small cell base station, the discovery channel comprising information indicating an interworking capability of the small cell base station between a cellular wide-area communication system and a wireless local-area communication system.

According to exemplary embodiments of the present invention, the at least one memory and the computer program code are arranged to, with the at least one processor, cause the apparatus at least to perform receiving a discovery channel from a small cell base station, and after reception of the discovery channel, initializing a search for an access point beacon of a wireless local-area communication system, wherein a transmission timing and a transmission interval of the access point beacon is set based on a transmission timing and a transmission interval of the discovery channel.

According to exemplary embodiments of the present invention, the at least one memory and the computer program code are arranged to, with the at least one processor, cause the apparatus at least to perform detecting a discovery channel from a small cell base station of a cellular wide-area communication network, detecting an access point of a wireless local area communication system located at the small cell base station, and reporting, to a base station of the cellular wide-area communication network, the detection of the access point.

For further functions of the user equipment according to further exemplary embodiments of the present invention, reference is made to the above description of methods according to certain embodiments of the present invention, as described in connection with FIGS. 8 to 10.

In the foregoing exemplary description of the apparatuses, i.e. the user equipment or base station (or part of the user equipment or base station), only the units that are relevant for understanding the principles of the invention have been described using functional blocks. The apparatuses may comprise further units that are necessary for its respective operation as user equipment or base station, respectively. However, a description of these units is omitted in this specification. The arrangement of the functional blocks of the apparatuses is not construed to limit the invention, and the functions may be performed by one block or further split into sub-blocks. Further, the apparatuses, i.e. the user equipment or base station, may be connected via a link 75/115. The link 75/115 may be a physical and/or logical coupling, which is implementation-independent (e.g. wired or wireless).

According to exemplarily embodiments of the present invention, a system may comprise any conceivable combination of the thus depicted devices/apparatuses and other network elements, which are arranged to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any procedural step or functionality is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, system in package (SIP), or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

Even though the present invention and/or exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

ABBREVIATIONS

AP Access Point
DL Downlink
eNB Enhanced Node B
EPC Evolved Packet Core
LTE Long Term Evolution
LTE-A Long Term Evolution Advanced
RRC Radio Resource Control
WLAN Wireless Local Access Network
UE User Equipment
UL Uplink
UTRA Universal Terrestrial Radio Access
MAC Media Access Control
PDCH Physical Discovery Channel

What is claimed is:

1. A method comprising:
   inserting, in a discovery channel, interworking capability information of a small cell base station of a small cell of a cellular wide-area communication network; and
   transmitting, by the small cell base station, the discovery channel including the interworking capability information of the small cell base station to a user equipment located in the small cell,
   wherein the interworking capability information of the small cell base station indicates a capability of the small cell base station to operate between a cellular wide-area communication system of the cellular wide-area communication network and a wireless local-area communication system of a wireless local-area communication network and includes discovery assistant information comprising at least one of a beacon interval, a working channel, a load indication, or neighbor access information of the wireless local-area communication system.

2. The method according to claim 1, wherein the discovery channel includes a request for requesting the user equipment to report detection of an access point of the wireless local-area communication system to a base station of the cellular wide-area communication network.

3. The method according to claim 1, comprising:
   receiving the discovery channel from the small cell base station, the discovery channel comprising the interworking capability information indicating the capability of the small cell base station to operate between the cellular wide-area communication system and the wireless local-area communication system.

4. The method according to claim 1, wherein the discovery channel comprises a predefined sequence part and a signaling content part, and wherein the signaling content part comprises the interworking capability information of the small cell base station.

5. The method according to claim 4, wherein
   a timing and frequency resource of the signaling content part is linked to the sequence part by a predefined offset.

6. The method according to claim 1, wherein the discovery assistant information further comprises a SSID.

7. An apparatus, comprising:
   at least one processor; and
   at least one memory coupled to the at least one processor, the at least one memory storing computer program code, which when executed by the at least one processor, cause the apparatus to perform:
   inserting, in a discovery channel, interworking capability information of a small cell base station of a small cell of a cellular wide-area communication network; and
   transmitting, from the small cell base station, the discovery channel including the interworking capability information of the small cell base station to a user equipment located in the small cell,
   wherein the interworking capability information of the small cell base station indicates a capability of the small cell base station to operate between a cellular wide-area communication system of the cellular wide-area communication network and a wireless local-area communication system of a wireless local-area communication network and includes discovery assistant information comprising at least one of a beacon interval, a working channel, a load indication, or neighbor access information of the wireless local-area communication system.

8. The apparatus according to claim 7, wherein the discovery channel includes a request for requesting the user equipment to report detection of an access point of the wireless local-area communication system to a base station of the cellular wide-area communication network.

9. The apparatus according to claim 7, wherein the discovery channel comprises a predefined sequence part and a signaling content part, and wherein the signaling content part comprises the interworking capability information of the small cell base station.

10. The apparatus according to claim 9, wherein
a timing and frequency resource of the signaling content part is linked to the sequence part by a predefined offset.

11. The apparatus according to claim 7, wherein the discovery assistant information further comprises a SSID.

12. The apparatus according to claim 7, wherein the apparatus is implemented in a base station located in a Long Term Evolution or Long Term Evolution Advanced based cellular communication network.

13. An apparatus for use in a user equipment, comprising:
at least one processor; and
at least one memory coupled to the at least one processor, the at least one memory storing computer program code which when executed by the at least one processor, cause the apparatus to perform:
detecting a discovery channel from a small cell base station of a cellular wide-area communication network;
detecting an access point of a wireless local area communication network located at the small cell base station of the cellular wide-area communication network; and
responsive to information included in the discovery channel, reporting, from the user equipment, to a macro cell base station of the cellular wide-area communication network, the detection of the access point of the wireless local area communication network located at the small cell base station of the cellular wide-area communication network, wherein the reporting of the detection of the access point is triggered by a predetermined indication in a signaling content of the discovery channel.

14. The apparatus according to claim 13, wherein the predetermined indication is a dedicated information bit for explicitly requesting the reporting.

15. The apparatus according to claim 13, wherein the predetermined indication is an indication of a wireless local area communication network capability of the small cell base station.

16. The apparatus according to claim 13, wherein the reporting comprises:
a first part in which the detection of the discovery channel and the detection of the access point of the wireless local area communication network is reported, and
a second part in which at least a signal strength of the wireless local area communication network is reported.

17. The apparatus according to claim 16, wherein in the second part, the wireless local area communication network related properties of the small cell base station are further reported.

18. The apparatus according to claim 16, wherein there is a fixed time offset between the first and the second part of the reporting.

19. The apparatus according to claim 13, wherein the apparatus is implemented in a user equipment located in a Long Term Evolution or Long Term Evolution Advanced based cellular communication network.

* * * * *